United States Patent
Kim et al.

(10) Patent No.: US 9,235,717 B1
(45) Date of Patent: Jan. 12, 2016

(54) SECURE COPY AND PASTE OF MOBILE APP DATA

(71) Applicant: MOBILE IRON, INC., Mountain View, CA (US)

(72) Inventors: Mansu Kim, Cupertino, CA (US); Suresh Kumar Batchu, Milpitas, CA (US); Joshua Sirota, Los Altos, CA (US)

(73) Assignee: MOBILE IRON, INC., Mountain View, CA (US)

( * ) Notice: Subject to any disclaimer, the term of this patent is extended or adjusted under 35 U.S.C. 154(b) by 41 days.

(21) Appl. No.: 14/189,810

(22) Filed: Feb. 25, 2014

Related U.S. Application Data

(60) Provisional application No. 61/768,635, filed on Feb. 25, 2013.

(51) Int. Cl.
- *G06F 7/04* (2006.01)
- *G06F 21/60* (2013.01)
- *G06F 9/54* (2006.01)

(52) U.S. Cl.
CPC .............. *G06F 21/606* (2013.01); *G06F 9/543* (2013.01)

(58) Field of Classification Search
CPC ................ G06F 21/10; G06F 21/6218; G06F 2221/2107; G11B 20/00086; H04L 63/08
USPC ............................................ 726/1, 16, 26, 27
See application file for complete search history.

(56) References Cited

U.S. PATENT DOCUMENTS

| | | | |
|---|---|---|---|
| 8,074,266 B2 * | 12/2011 | Yoneda | 726/9 |
| 8,695,060 B2 * | 4/2014 | Wade et al. | 726/1 |
| 2004/0194153 A1 * | 9/2004 | Garg et al. | 725/151 |
| 2011/0131490 A1 * | 6/2011 | Jeong et al. | 715/702 |
| 2014/0007222 A1 * | 1/2014 | Qureshi et al. | 726/16 |
| 2014/0032733 A1 | 1/2014 | Barton et al. | |

* cited by examiner

*Primary Examiner* — Ali Abyaneh
(74) *Attorney, Agent, or Firm* — Van Pelt, Yi & James LLP

(57) ABSTRACT

Secure transfer of mobile application content is disclosed. A state-related event associated with a managed application in a managed set of applications may be detected. It may be determined that content from the managed application is stored at a public storage location on a mobile device. At least a portion of the content may be transferred to a secure storage location accessible to the managed set.

22 Claims, 7 Drawing Sheets

SECURE COPY AND PASTE OF MOBILE APP DATA

CROSS REFERENCE TO OTHER APPLICATIONS

This application claims priority to U.S. Provisional Patent Application No. 61/768,635 entitled SECURE COPY AND PASTE OF MOBILE APP DATA filed Feb. 25, 2013, which is incorporated herein by reference for all purposes.

BACKGROUND OF THE INVENTION

Transferring content (e.g., cutting/copying and pasting content) from application to application, between contexts of an application, and/or within a context of an application are common operations on a mobile device. These operations may, in certain scenarios, expose sensitive content to retrieval by untrusted nodes on a mobile device.

In certain cases, a mobile device (e.g., deployed in an enterprise) may include managed applications (e.g., enterprise applications), non-managed applications (e.g., personal applications, non-managed applications), and/or other types of applications. Enterprises may seek to ensure content is securely transferred between and/or within managed applications. Content transfer operations on a mobile device are typically executed by transferring data from a context of an application to a public storage location (e.g., pasteboard, clipboard, paste buffer, etc.). And any application on the mobile device may be able to retrieve data from the public storage location.

BRIEF DESCRIPTION OF THE DRAWINGS

Various embodiments of the invention are disclosed in the following detailed description and the accompanying drawings.

DETAILED DESCRIPTION

Figure 1:
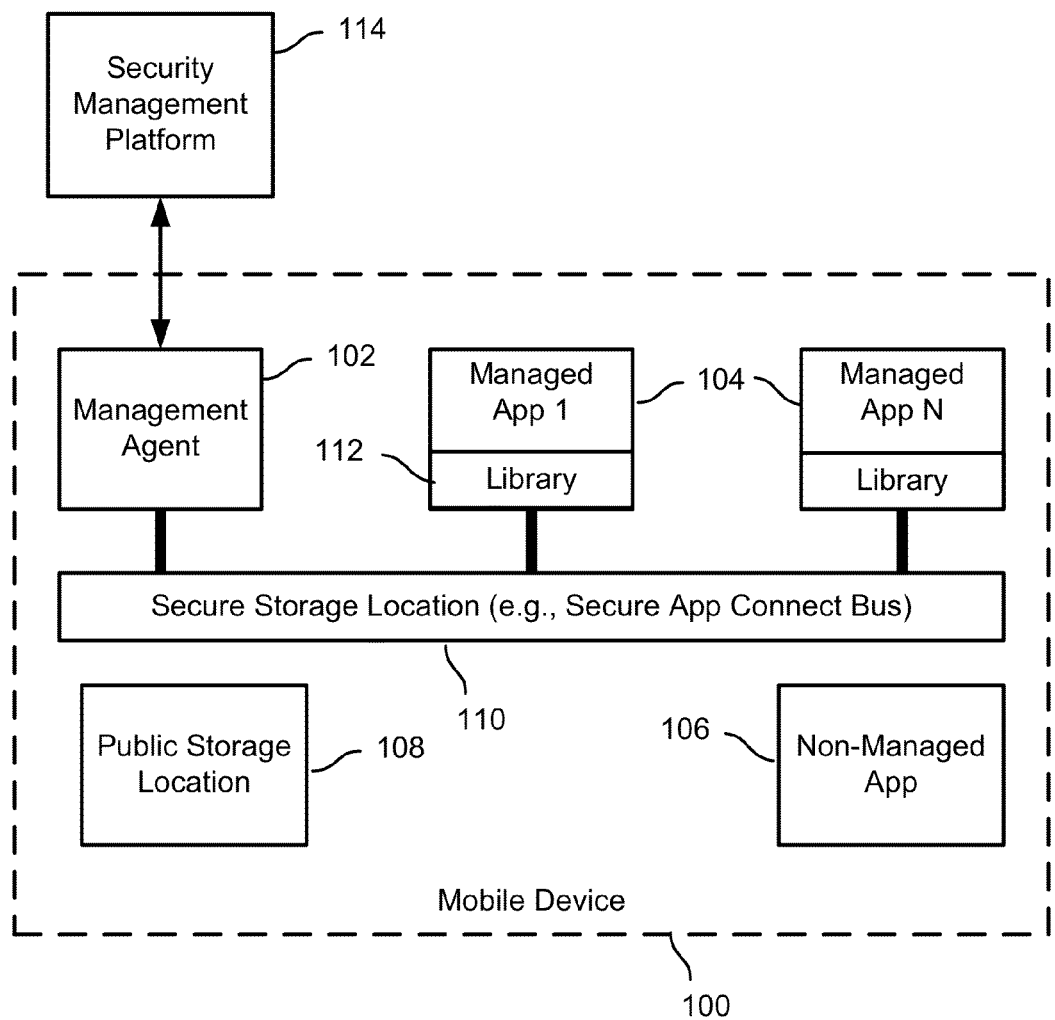
FIG. 1 is a block diagram illustrating an embodiment of a system to securely transfer application content.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Secure transfer of mobile application content is disclosed. In various embodiments, a state-related event associated with a managed application in a managed set of applications may be detected. It may be determined that content from the managed application is stored at a public storage location on a mobile device. At least a portion of the content may be transferred to a secure storage location accessible to the managed set.

The techniques disclosed herein may be used to securely transfer (e.g., copy and paste, cut and paste, and/or otherwise transfer) content from application to application, between contexts of an application, and/or within a context of an application. For example, content provided from a managed application to public storage location may be transferred from the public storage location to a secure storage location upon occurrence of a state-related event (e.g., a transition from foreground to background) associated with the managed application. Transferring content to secure storage location upon occurrence of a state-related event may reduce the likelihood of a non-managed application accessing managed application content while the managed application is not active (e.g., in the foreground, etc.). In various embodiments, content may be transferred directly to a secure storage location (e.g., not to a public storage location) in response to a content transfer command (e.g., cut command, copy command, etc.)

FIG. 1 is a block diagram illustrating an embodiment of a system to securely transfer application content. In the example shown, a mobile device 100 (e.g., smartphone, tablet, etc.) includes a management agent 102 (e.g., a mobile device management (MDM) agent, a trusted management agent, trust client app), managed application(s) 104 (e.g., enterprise application(s), authorized application(s), trusted application(s)), non-managed application(s) 106 (e.g., personal applications, non-managed applications, non-authorized applications, untrusted applications), and/or other applications. The managed applications 104 may be associated with an enterprise (e.g., business, organization, agency, etc.). Managed applications 104 may, for example, include one or more applications managed in a mobile device management (MDM) architecture. The managed applications 104 may include information sensitive (e.g., confidential) to the enterprise. For example, a managed file access application may include and/or provide access to enterprise sensitive information. In another example, a managed enterprise mail client may include and/or provide access to enterprise sensitive mail content and/or other data.

Typically, applications (e.g., managed applications 104, non-managed applications 106) may transfer content (e.g., copy and paste content, cut and paste content, and/or otherwise transfer content) via a public storage location 108 (e.g., pasteboard, clipboard, paste buffer). For example, content may be transferred from a first application context to a second application context (e.g., within an application), from a first application to a second application (e.g., between applications), and/or within a context of an application (e.g., from one location in an application context to another location in that context) via the public storage location 108. In certain cases, once stored in the public data storage location 108, the content may be available for retrieval by any application on the mobile device. An application may, for example, retrieve the content from the public storage location 108 based at least in part on, for example, a paste command.

According to some embodiments, the management agent 102, managed applications 104, and/or other mobile device components may be components of an MDM system. The management agent 102, managed applications 104, and/or other components may share information/data in a secure manner via a secure data storage location 110 (e.g., secure data connection bus, secure inter-application connection bus, secure application communication bus, etc.). For example, information may be shared in a secure manner among applications (e.g., managed applications 104) authorized to access the secure data storage location 110. In some embodiments, data may be transferred in a secure manner among applications authorized to have access to the secure data storage 110 by storing the data in an encrypted form (e.g., cipher text, hash), in a data storage location (e.g., a paste board, clipboard, shared keychain location, and/or other storage), which is accessible to (e.g., exclusively accessible to) nodes authorized to access the secure data storage location 110. In various embodiments, data may be transferred in a secure manner from a first application (e.g., a managed application 104) to a second application (e.g., a managed application 104) authorized to have access to the secure data storage location 110 by calling a uniform resource locator (URL) scheme associated with the second application (e.g., a scheme name associated with the second application) and including the encrypted data.

In some embodiments, a library 112 (e.g., a data transfer library, copy and paste library, cut and paste library, etc.) may be associated with a managed application 104. The library 112 may be compiled into the application 104, wrapped into the application 104, a software development kit (SDK) associated with the application 104, and/or otherwise associated with an application 104. The library 112 may modify an application's code to behave differently than the corresponding unmodified version of the application behaves. For example, the library 112 may reconfigure a managed application 104 to allow the management agent 102 to perform actions on behalf of the managed application 104 including transferring content between a public data storage location 108 and a secure data storage location 110, invoking other managed applications 104, accessing/storing application data, securing data (e.g., encrypting data), decrypting data, invoking mobile operating system components, and/or using mobile device resources.

In various embodiments, a library 112 may mediate communication between a managed application 104 and a management agent 102, other managed application(s) 104, and/or non-managed application(s) 106. The library 112 associated with a managed application 104 may be configured to communicate with a management agent 102, other managed applications 104, and/or other components via the secure data storage location 110. By way of example, the management agent 102 may configure the libraries 112 associated with the managed application(s) 104 to securely transfer content using the secure storage location 110. For example, content (e.g., application content) may be transferred in a secure manner from a first application (e.g., a management agent 102, managed application 104, etc.) to a second application (e.g., a management agent 102, managed application 104) by storing the data in an encrypted form in the secure storage location 110. In various embodiments, any of the techniques discussed herein may be executed by librar(ies) 112 associated with one or more managed applications 104, a managed application 104, the management agent 102, the security management platform 114, and/or any other node.

In various embodiments, data may be transferred in a secure manner from a first application (e.g., a management agent 102, managed application 104, etc.) to a second application (e.g., a management agent 102, managed application 104) by calling a uniform resource locator (URL) scheme associated with the second application and including encrypted data in the URL call. This URL scheme-based technique may also be used to invoke applications as well as to transfer content from a managed application 104 to the management agent 102 and/or between managed applications 104.

In various embodiments, a security management platform 114 (e.g., a virtual smartphone platform, security management server, etc.) manages polic(ies) (e.g., secure content transfer polic(ies), secure copy and paste polic(ies)), configuration(s) (e.g., application data configuration(s)), and/or settings associated with the mobile device 100. The security management platform 114 may manage (e.g., control, dictate, determine) the configurations, policies, settings, and/or other functional aspects of one or more of the managed applications 104 on the mobile device 100. For example, the security management platform 114 may communicate with and/or execute actions on the managed applications 104 using the management agent 102 as an intermediary. Configuration changes, policy updates, setting changes, and/or commands for the managed applications 104 may be pushed to the management agent 102 for secure distribution to the applications 104. In some embodiments, the management agent 102 may, for example, connect to the security management platform 114 (e.g., on a periodic basis) to update the device 100 status, retrieve policy information, retrieve configuration information, and/or perform other operations.

In some embodiments, one or more managed applications 104 (e.g., a managed set of applications) may be designated at the security management platform 114 (e.g., by an administrator). The managed applications 104 may be configured to transfer data securely using the techniques disclosed herein. For example, an administrator may designate at the security management platform 114 (e.g., via console, user interface) a list of managed applications 104 authorized to securely transfer content. The list may be provided to the management agent 102, and the management agent 102 may configure the managed applications 104 included on the list for secure content transfer. In some embodiments, content, file, data and/or information types supported for secure data transfer (e.g., within and/or between the managed applications 104) may be designated (e.g., determined) at the security management platform 114. For example, content types may include text, images, videos, arrays, objects, and/or any other type of content. File types may include, for example, .doc, .jpeg, .pdf, and/or any other file type. An administrator may, for example, designate certain content types, file types, and/or other categories of information as supported by the secure content transfer techniques disclosed herein.

Figure 2:
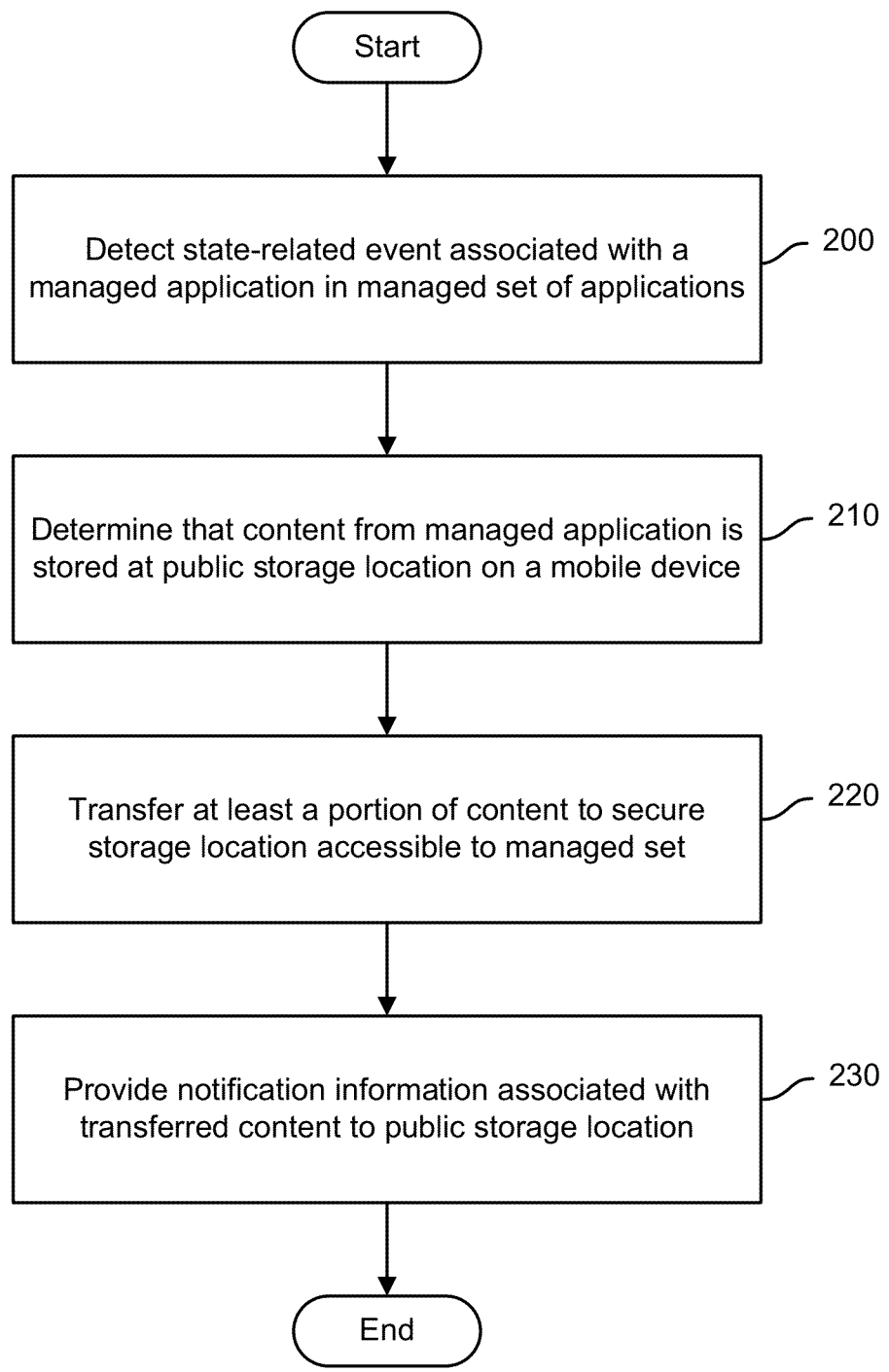
FIG. 2 is a flow chart illustrating embodiments of a process of secure mobile application data transfer.

FIG. 2 is a flow chart illustrating embodiments of a process of secure mobile application data transfer. In various embodiments, the process is performed by the system 100 of FIG. 1. At 200, a state-related event associated with a managed application in a managed set of applications is detected. A state-related event may include any event associated with the state of a managed application and/or a mobile device on which the managed application is installed. For example, states associated with an application may include foreground (e.g., application is active an receiving events), active (e.g., application running in foreground and receiving events), inactive (e.g., in foreground but not currently receiving events), background (e.g., in background and executing code, transitioning from foreground to suspended), suspended (e.g., application is in the background and is not executing code, remains in memory but does not execute any code), not running (e.g., application is not launched, terminated, killed, etc.), and/or any other state associated with an application. By way of further example, states associated with a mobile device may include active (e.g., device is in use, transmitting/receiving information), unlocked, locked, inactive, sleep, powered down, and/or any other state associated with a mobile device.

In various embodiments, a state-related event may occur when a state associated with an application, the mobile device, and/or other node associated with the mobile device changes. By way of example, a state-related event may include an indication that the application is closing (e.g., an application closing operation has been initiated), an indication that the application is to be killed (e.g., an application kill operation has been initiated), the application is transitioning from a foreground state to a background state, the application is transitioning from active state to an inactive state, and/or any other change in state associated with the managed application. A managed application may transfer from a foreground state to a background state and/or another state when, for example, a user kills the managed application, switches to another application (e.g., activates another application), and/or performs another operation. In another example, a state-related event may occur when the mobile device transitions between states (e.g., from active to inactive, etc.).

In various embodiments, a state-related event associated with a managed application may be detected by a library associated with a managed application, a management agent, another application (e.g., a library associated with another managed application), a server associated with the mobile device (e.g., security management platform 114 of FIG. 1), and/or other node. For example, a library associated with a managed application may detect that the managed application is and/or will (e.g., within a period of time) transition from a foreground state to a background state and/or other state.

In some embodiments, the state-related event associated with the managed application may include a state change associated with another application (e.g., a non-managed application). For example, a library associated with the managed application may detect that a non-managed application is transitioning to the foreground, background, and/or another state. In certain cases (e.g., in certain mobile device operating systems), applications may access the public storage location only when they are in the foreground, background, and/or other active state. A change of state associated with the non-managed application (e.g., a transition from inactive to foreground state) may therefore indicate that the non-managed application may gain access (e.g., is about to gain access) to the public storage location (e.g., upon transitioning to the foreground).

At 210, it may be determined that content from the managed application is stored at a public storage location on a mobile device. In some embodiments, a managed application (e.g., a library associated with a managed application), management agent, and/or other node may determine that content (e.g., text, image(s), video(s), etc.) is stored at the public storage location. For example, a query may be executed (e.g., by a library) to determine whether data is stored at the public storage location. In various embodiments, it may be determined that data stored in the public storage location was provided from a managed application based on, for example, a previously executed command associated with the managed application (e.g., a copy command, cut command, etc.), metadata associated with the content stored in the public storage location, and/or using another technique. For example, a library associated with a managed application, the mobile device operating system, and/or other node may have an awareness that content has been provided to the public storage location (e.g., based on a detection of the copy/cut command).

At 220, at least a portion of the content may be transferred to a secure storage location accessible to the managed set of applications. In various embodiments, a library associated with a managed application may transfer managed application content from the public storage location to a secure storage location that is accessible (e.g., exclusively accessible) to one or more applications in the managed set of applications. The content from the managed application may, for example, be transferred to the secure storage location before (e.g., prior to) another application (e.g., a non-managed application) is able to access the content at the public storage location. In various embodiments, a library associated with a managed application may detect a state-related event, and the detection of the state-related event may trigger transfer of the content from the public storage location to the secure storage location.

According to various embodiments, secured content may be generated based on the content stored at the public storage location, and the secured content may be transferred to a secure storage location. In some embodiments, the content stored at the public storage location may be used to generate secured content by, for example, encrypting the content and/or otherwise making the content not accessible to un-trusted parties (e.g., via non-managed applications). The content may be encrypted using any encryption technique including, for example, Diffie-Hellman encryption, Diffie-Hellman elliptic-curve encryption, AES256 encryption, symmetric key encryption, and/or any other encryption technique. For example, a cryptographic key/certificate/credential exchange operation (e.g., handshake) may be executed between one or more managed applications. The content stored at the public storage location may be secured by encrypting the content using encryption keys, certificates, credentials, and/or other information exchanged during the encryption handshake process. The encrypted content (e.g., secured content, cipher text, hash) may be stored at a secure storage location (e.g., a secure application connection bus) accessible (e.g., exclusively accessible) to applications in the managed set of applications.

In some embodiments, transferring at least a portion of the content includes generating secured content based at least in part on the content stored at the public storage location and replacing the content at the public storage location with the secured content. By replacing the non-secure content at the public storage location with secure content (e.g., encrypted content), the public storage location becomes a secure storage location. In one example, an encrypted version (e.g., copy) of the content at the public storage location may be generated, and the encrypted content may replace the content (e.g., unsecured, unencrypted, in the clear content) stored at public storage location. The unencrypted content (e.g., unencrypted version of the content) may be, for example, removed (e.g., deleted) from the public storage location, and the encrypted version may be stored at the public storage location (e.g., in its place).

At 230, notification information associated with the transferred content may be provided to the public storage location. Notification information may include, for example, information stating that "Enterprise data is not allowed to be copied," "Copying enterprise data is disabled by administrator," and/or any other notification. For example, the notification information may be provided to the public storage location so that in the event a non-managed application retrieves data from the public storage location (e.g., as part of a paste operation), a display may be provided in the non-managed application notifying the user that the paste operation was unsuccessful.

Figure 3:
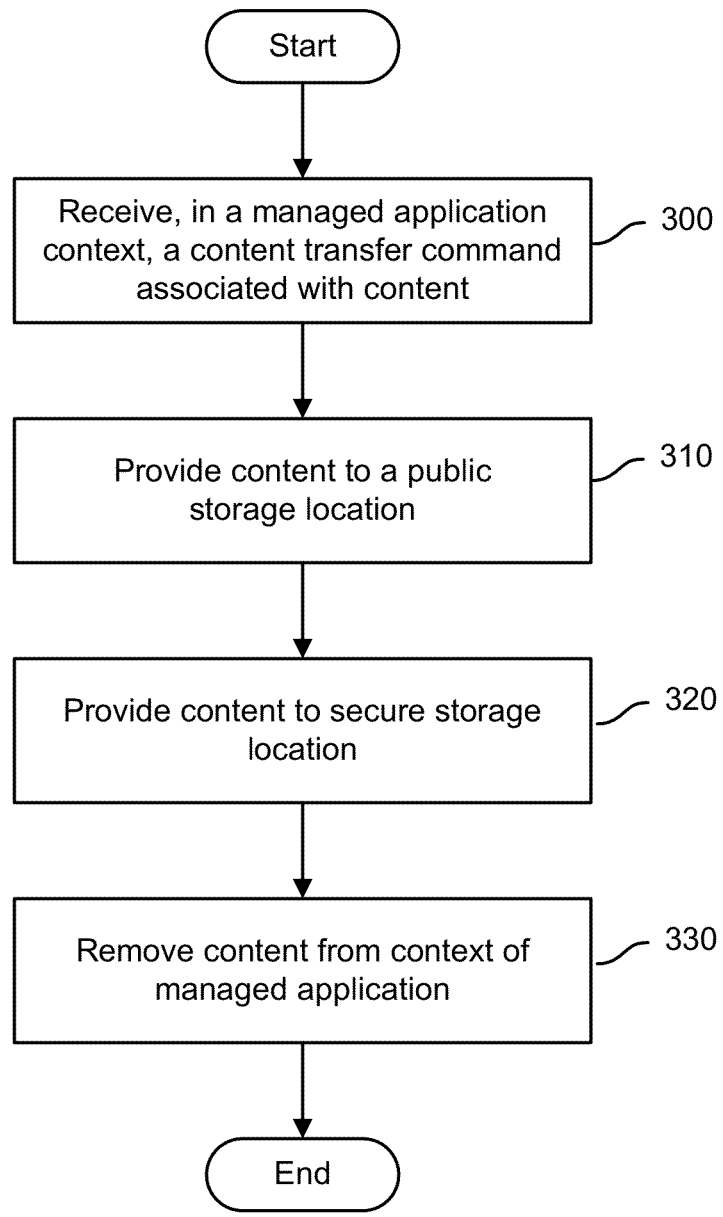
FIG. 3 is a flow chart illustrating embodiments of a process of secure mobile application data transfer.

FIG. 3 is a flow chart illustrating embodiments of a process of secure mobile application data transfer. In various embodiments, the process is performed by the system 100 of FIG. 1. At 300, a content transfer command associated with content may be received in the context of a managed application. A content transfer command (e.g., content transfer indication, request, etc.) may include, for example, a copy command, cut command, and/or any other content transfer command received in a context of a managed application. For example, a user of the managed application may select a portion of content (e.g., highlight text, image, and/or other content via a touch interface) displayed in the managed application.

In some embodiments, a content transfer command may be received from another application (e.g., a non-managed application). For example, an application may request content from a managed application. In some cases, an application may request information associated with a user (e.g., login credentials) from a managed application.

At 310, content may be provided to a public storage location. In some embodiments, content associated with a content transfer command (e.g., a copy command, cut command, etc.) may be provided to a public storage location. For example, a user may select content in a context of a managed application and execute a copy, cut, and/or other content transfer command. The selected content may be, for example, transferred to a public storage location (e.g., for retrieval by the managed application and/or another application).

At 320, content may be provided to a secure storage location. In various embodiments, content associated with a content transfer command (e.g., a copy command, cut command, etc.) may be provided directly to a secure storage location (e.g., not to the public storage location). For example, a content transfer command may be executed, and the library associated with the managed application may hook the content that is to be transferred to the public storage location. In one example, the hooked content may be encrypted and provided to the secure storage location. In various embodiments, the content provided to the secure storage location may be accessible to managed applications (e.g., exclusively to managed applications) for retrieval using the techniques discussed herein. In some embodiments, this step may be optional and content may only be provided to a public storage location upon execution of a content transfer command. In various embodiments, content may only be provided to the secure storage location upon execution of a content transfer command.

In various embodiments, the content associated with a content transfer command may be provided to both a secure storage location and a public storage location. For example, the content may be secured (e.g., encrypted) and the encrypted content may be provided to the public storage location. The encrypted content may also be provided to the secure storage location. In some embodiments, the content may be provided to the public storage location and/or secure storage location in an unsecured (e.g., unencrypted format).

At 330, content may be removed from the context of the managed application. The content provided to the public storage location and/or private storage location may be removed (e.g., deleted) from the context of the managed application. Content may be, for example, removed from the context of the application when a content cut command and/or other type of command is received. In certain cases, the content may be removed (e.g., deleted) from the context of the managed application prior to, at the same time as, and/or after the content is provided to the public storage location. In some embodiments, this step may be optional (e.g., in the case of a copy command), and content may not be removed from the context of the managed application.

Figure 4:
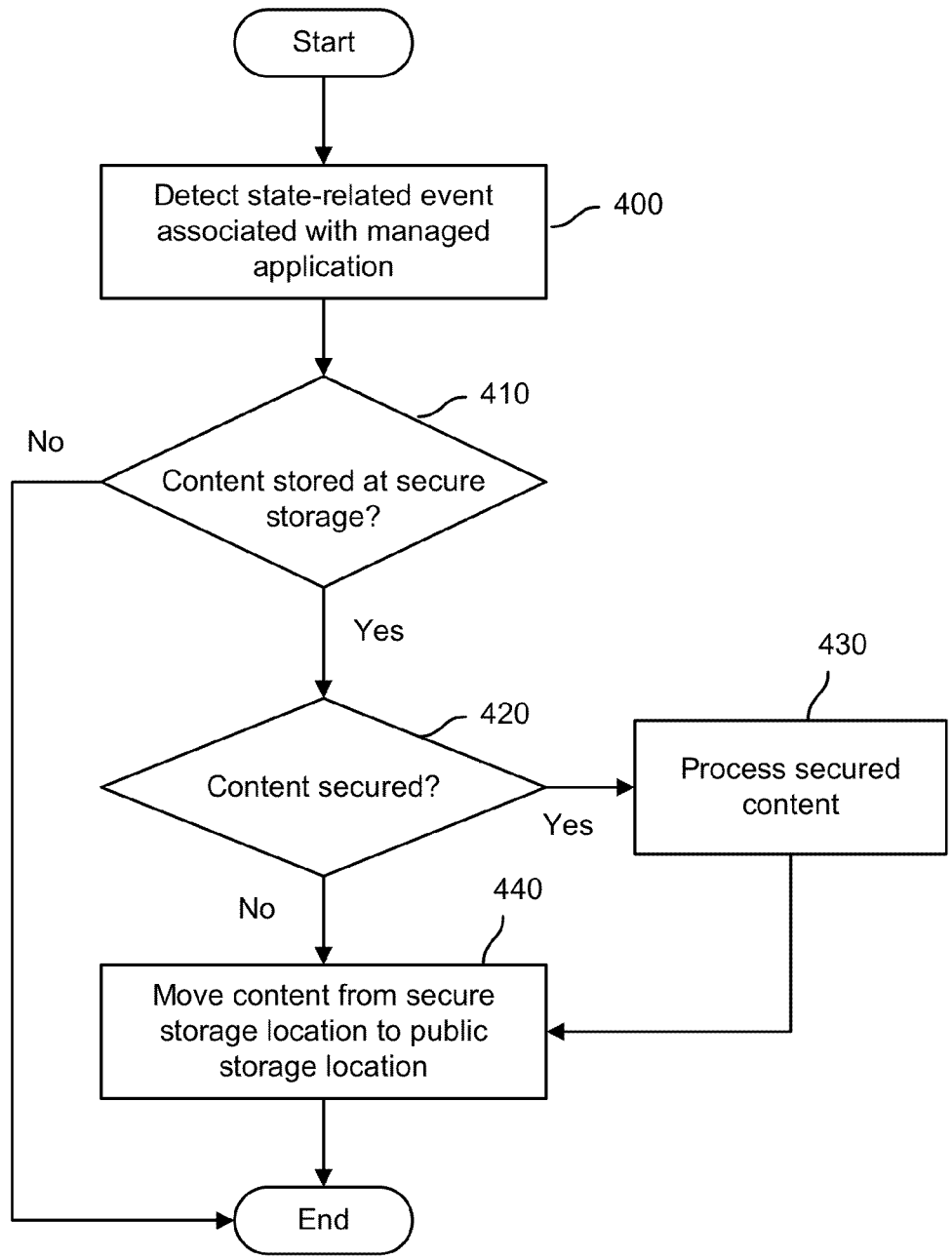
FIG. 4 is a flow chart illustrating embodiments of a process of secure mobile application data transfer.

FIG. 4 is a flow chart illustrating embodiments of a process of secure mobile application data transfer. In various embodiments, the process is performed by the system 100 of FIG. 1. At 400, a state-related event associated with a managed application may be detected. In some embodiments, a state-related event may be detected by a library associated with the managed application (e.g., the managed application that is changing states), by another application on the mobile device, and/or by another node associated with the mobile device. For example, the managed application may include a managed application that provided content to the public storage location (e.g., as disclosed in FIG. 3), a second managed application (e.g., a different managed application than a managed application that provided content to the public storage location), and/or any other managed application. In various embodiments, a state-related event may include any event associated with the state of a managed application and/or a mobile device on which the managed application is installed. For example, a state-related event may occur when a managed application transitions from a not running state (e.g. suspended state) to a foreground state (e.g., active state) and/or any other transition.

At 410, it may be determined whether content is stored at a secure storage location. In some embodiments, based at least in part on a detected state-related event, a library associated with a managed application and/or another node may determine whether any content is stored at a secure storage location. This determination may be made by, for example, querying the secure data storage location, attempting to retrieve data from the secure data storage location, and/or otherwise checking for content at the secure data storage location. For example, a library associated with a managed application may determine that content is stored a secure storage location by attempting to and successfully retrieving content from secure storage location. In the event content is stored at the secure storage location, the process may proceed to step 420. In the event content is not stored at the secure storage location, the process may end.

At 420, it may be determined whether the content stored in the secure storage location is secured. In some embodiments, content stored at the secure storage location may be encrypted, protected (e.g., password protected), masked, and/ or otherwise secured. For example, it may be determined that the content (e.g., stored at the secure storage location) is secured by, for example, comparing the content to a database of content (e.g., a dictionary of content, images, etc.), parsing the content to determine a content type (e.g., text, image, video, etc.), analyzing the content, and/or using another approach. For example, in the event the content does not match a database of content, content type(s), and/or other information, it may be determined that the content is secured. In the event the content is determined to be secured, the process may proceed to step 430. In the event the content determined to be not secured, the process may proceed to step 440.

At 430, secured content may be processed. In various embodiments, encrypted content may be decrypted, protected content may be unlocked, and/or other processing may be performed. A library associated with the managed application may, for example, process the content such that the content is accessible upon retrieval by the application. In one example, secure content may be encrypted using keys, certificates, and/or other encryption information shared amongst the managed application, and the encryption information may be used to decrypt the content. In some embodiments, the secure content may be processed such that the content is accessible (e.g., decipherable, usable, etc.) by a managed application that retrieves the content (e.g., from the public storage).

At 440, content may be moved (e.g., transferred) from the secure storage location to a public storage location. In various embodiments, a library associated with the managed application may transfer the content from the secure storage location to the public storage location. The content may be transferred to the public storage location so that it can be retrieved by the managed application, for example, in response to a data transfer command (e.g., a paste command).

In some embodiments, a secure data storage location may include a public storage location (e.g., accessible to at least one non-managed application) that includes encrypted content. Data stored in a public storage location may be effectively stored at a secure storage location by virtue of the fact that the data is encrypted and/or otherwise secured. For example, secured content on the public data storage location may be moved (e.g., transferred) by processing the secured content (e.g., decrypting the secured content) to generate a clear version (e.g., an in the clear version) of the content. The secure content at the public storage location may be replaced by the unencrypted content.

In various embodiments, the content moved to the public storage location may be accessible to any application on the mobile device. In certain cases depending on the mobile device operating system, however, only applications running in the foreground may be able to retrieve content from the public storage location. For example, applications that are deactivated, in the background, suspended and/or otherwise not in the foreground may not have access to the public storage location (e.g., may not be configured to retrieve data while in a deactivated state).

Figure 5:
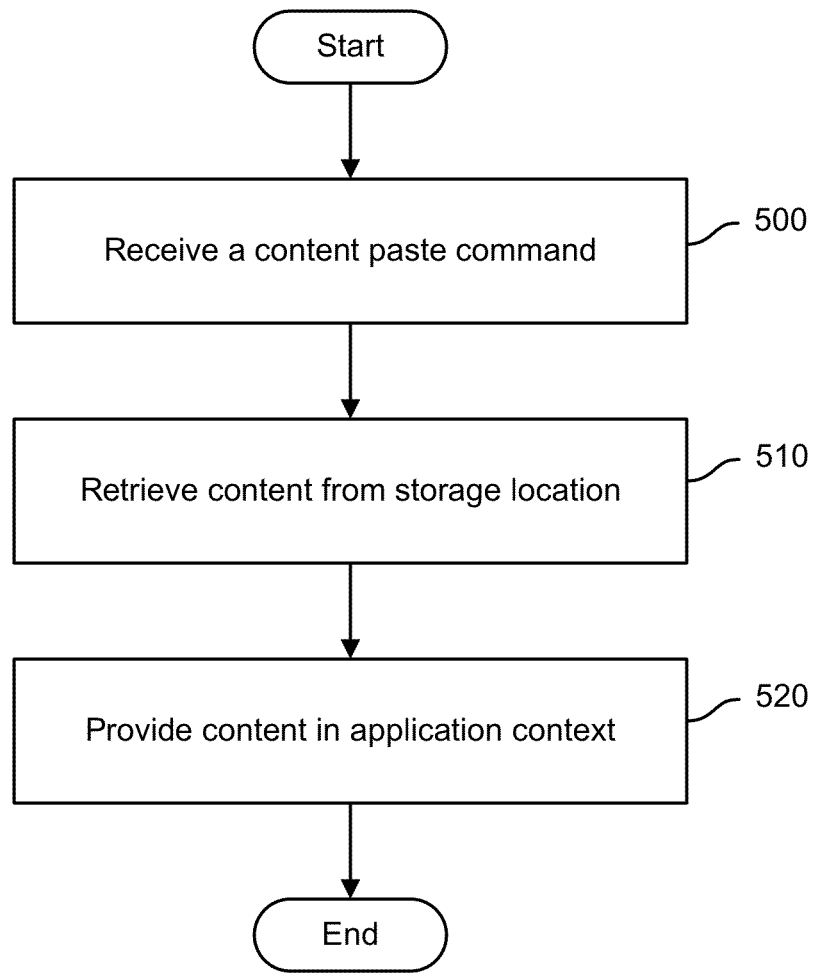
FIG. 5 is a flow chart illustrating embodiments of a process of secure mobile application data transfer.

FIG. 5 is a flow chart illustrating embodiments of a process of secure mobile application data transfer. In various embodiments, the process is performed by the system 100 of FIG. 1. At 500, a content paste command (e.g., content paste indication) may be received. In various embodiments, a content paste command may be received (e.g., from a user) in a context of a managed application. For example, a user of a mobile device may execute a paste command (e.g., via a touchscreen gesture, keyboard input, etc.) in the context of a managed application.

At 510, content may be retrieved from a storage location. In some embodiments, a library associated with a managed application may retrieve (e.g., based on the paste command) content from the public storage location. The content at the public storage location may, for example, have been previously decrypted and/or otherwise processed for insertion in a context of an application. As discussed above, the content may have been transferred to the public storage location from a secure storage location, decrypted, and/or otherwise prepared for retrieval as discussed above.

In various embodiments, the managed application (e.g., a library associated with the managed application) may retrieve content from a secure storage location. The content at the private storage location may have been provided to the secure storage location as part of the execution of a content transfer command as discussed herein. The content at the secure storage location may, for example, have been provided to the secure storage location from a managed application (e.g., based on a content transfer command execution) as discussed herein.

At 520, content may be provided in an application context. In some embodiments, content retrieved from a public storage location may be provided in a context of a managed application. For example, in response to a paste command in a context of a managed application, content may be retrieved from the public storage location and provided in the context of the application. For example, text, images, video, and/or any other type of content retrieved from the public storage location may be provided (e.g., pasted) into the context of the application.

Figure 6:
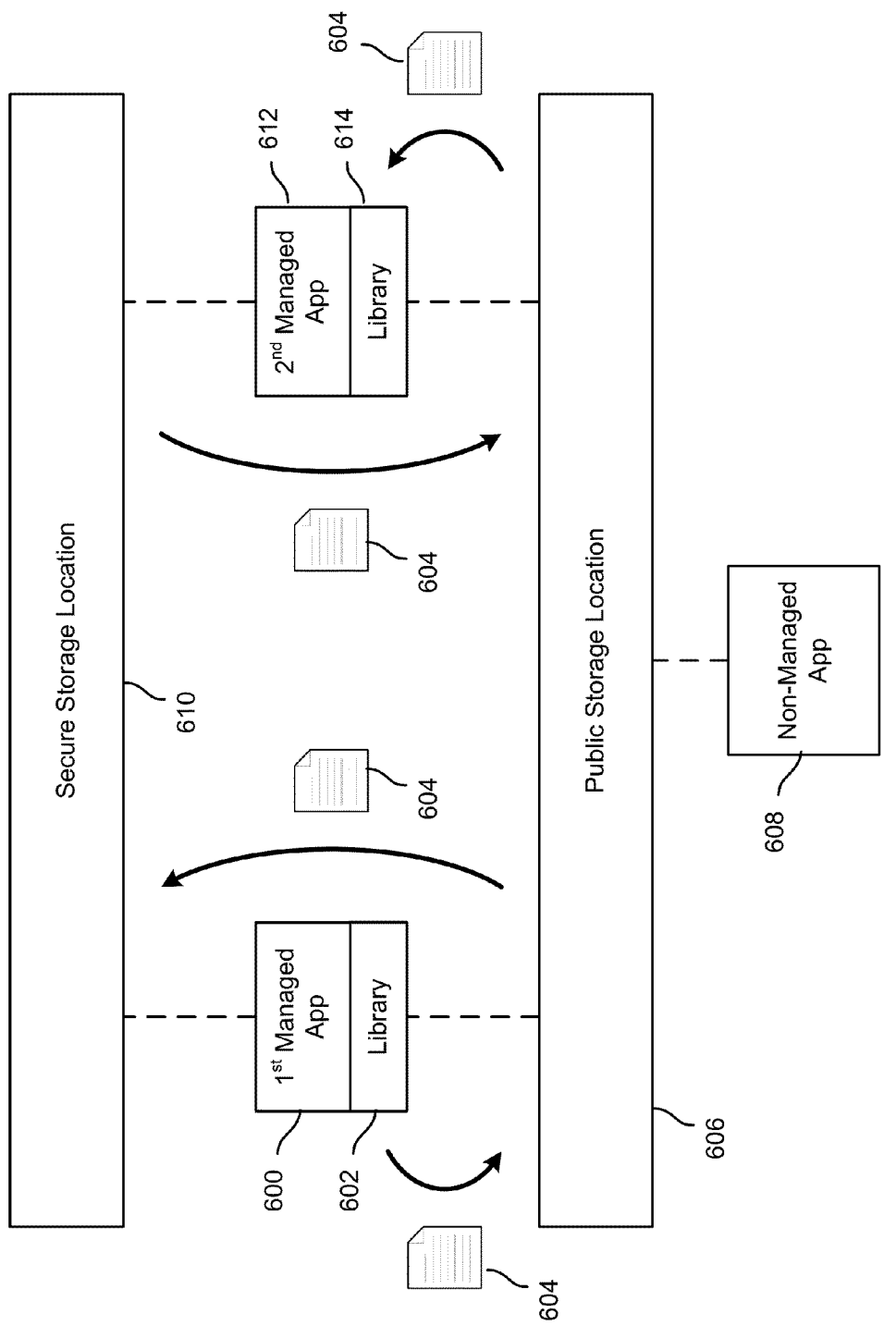
FIG. 6 is a block diagram illustrating embodiments of a process of secure mobile application data transfer.

FIG. 6 is a block diagram illustrating embodiments of a process of secure mobile application data transfer. In the example shown, a content transfer indication (e.g., a copy command) associated with selected content may be received in a context of a first managed application 600 (e.g., a window of the first managed application). Based on the content transfer indication, a library 602 may provide the content 604 to a public storage location 606 (e.g., a public pasteboard, clipboard, paste buffer, etc.). Content stored at the public storage location 606 may be accessible to at least one non-managed application 608, multiple applications, and/or all applications on the mobile device. A state-related event (e.g., an indication the application transitioning from the foreground to background) associated with the first managed application 600 may be detected by, for example, the library 602 associated with the first managed application 600. The library 602 may, at least in part in response to the detected state-related event, check for and/or determine that content 604 is stored at the public storage location 606. The library 602 may transfer the content 604 to a secure data storage location 610. Certain mobile device operating systems may only allow applications operating in the foreground and/or other active states to retrieve content and/or perform other operations. And, in certain cases, only one application may be allowed to be in the foreground and/or active state at one time. The content 604 therefore may be transferred to the secure storage location 610 (e.g., before another application becomes active) so that non-managed applications 608 are not able to access the content 604.

In various embodiments, a state-related event associated with a second managed application 612 may be detected. For example, the second managed application 612 may be activated (e.g., by a user opening the application), and a library 614 associated with the second managed application 612 may detect the activation event. The library 614 associated with the second managed application 612 may check for and/or determine that content is stored at the secure storage location

610. The library 614 may transfer the content 604 to the public storage location 606 so that, for example, the second managed application 612 may retrieve the data (e.g., in a paste operation). In some embodiments, a paste command may be received in a context of the second managed application 612, and the content 604 may be retrieved (e.g., by the library 614) from the public storage location 606. The content 604 may be provided in a second managed application 612 context by, for example, pasting the content 604 into the context.

Figure 7:
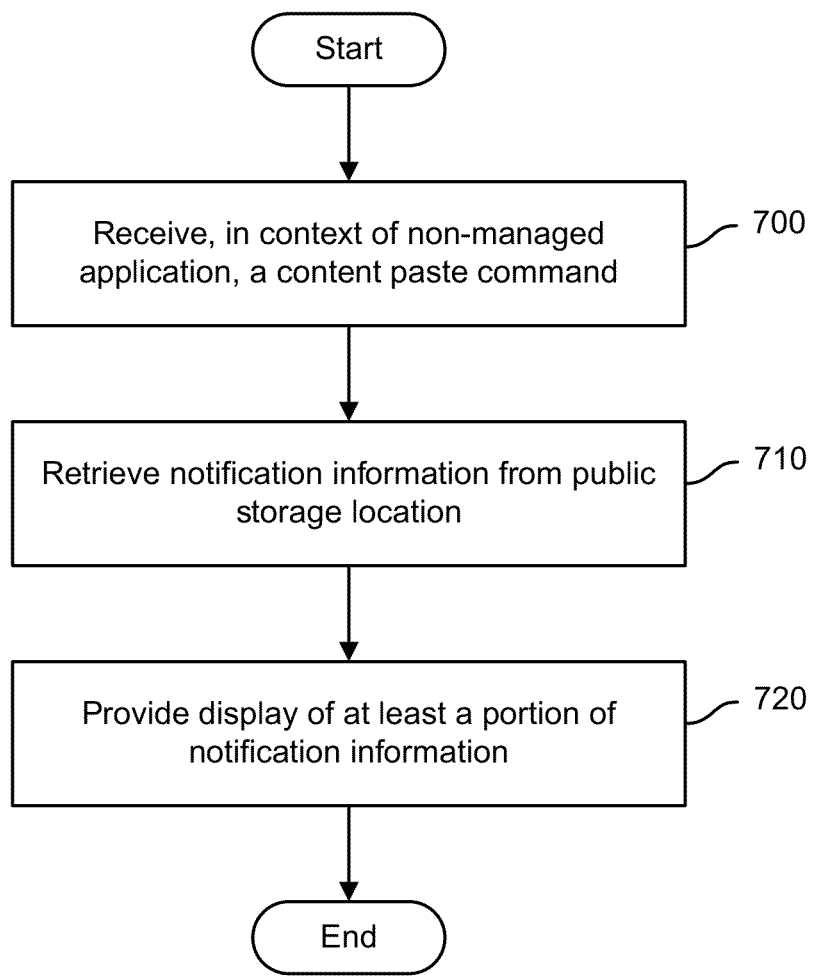
FIG. 7 is a flow chart illustrating embodiments of a process of restricting content transfer to non-managed applications.

FIG. 7 is a flow chart illustrating embodiments of a process of restricting content transfer to non-managed applications. In various embodiments, the process is performed by the system 100 of FIG. 1. At 700, a content paste indication may be received in a context of a non-managed application. A non-managed application may be, for example, a personal application, an application not managed by an enterprise, not designated for inclusion in the set of managed applications, and/or another type of application.

At 710, notification information may be retrieved from the public storage location. In some embodiments, a non-managed application may execute a paste command, and may retrieve data from the public storage location as part of the command execution. In some embodiments, because any data provided to the public storage location from a managed application would have been, upon a state-related event, removed from the public storage location and transferred to the secure storage location, content from the managed application will not be stored at the public storage location. In some embodiments, a notification (e.g., "Enterprise data is not allowed to be copied," "Copying enterprise data is disabled by administrator") may have been provided to the public storage location replacing the content. The non-managed application may retrieve the notification information from the public storage location.

At 720, a display based at least in part on the notification information may be provided. For example, a display may be provided in the context of the non-managed application including the notification information (e.g., "Enterprise data is not allowed to be copied").

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   detecting a state-related event affecting accessibility of content used in association with a managed application in a managed set of applications, wherein the state-related event includes one or more of: (i) closing the managed application, (ii) killing the managed application, (iii) transitioning of the managed application from a foreground state to a background state, (iv) transitioning of the managed application from the foreground state to a suspended state, and (v) transitioning of the managed application from an active state to an inactive state;
   in response to detecting the state-related event, determining whether the content is stored at a public storage location on a mobile device; and
   at least partially in response to the detected state-related event and determining that the content is stored at the public storage location on the mobile device, securing the content, wherein the securing of the content includes transferring the content to a secure storage location on the mobile device, and wherein the secure storage location is accessible to the managed set of applications and is not accessible to applications not included in the managed set of applications.

2. The method of claim 1, wherein the securing of the content includes:
   encrypting the content.

3. The method of claim 1, further comprising:
   detecting, at a second managed application, a second state-related event;
   determining that the content is stored at the secure storage location; and
   transferring the content from the secure storage location to the public storage location.

4. The method of claim 1, further comprising:
   receiving, in a context of a second managed application, a content paste command;
   retrieving, based at least in part on the content paste command, the content from the public storage location, wherein the content was moved from the secure storage location to the public storage location; and
   providing the content in the context of the second managed application.

5. The method of claim 1, further comprising:
   detecting, in a context of the managed application, a second state-related event;
   determining that the content is stored at the secure storage location; and
   transferring the content from the secure storage location to the public storage location.

6. The method of claim 1, further comprising providing notification information associated with the content to the public storage location that is accessible to one or more applications not included in the managed set.

7. The method of claim 6, further comprising:
   receiving, in a context of a non-managed application, a content paste indication;
   retrieving the notification information from the public storage location; and
   providing, in the context of the non-managed application, a display including at least a portion of the notification information.

8. The method of claim 1, wherein the public storage location is accessible to at least one application not included in the managed set of managed applications.

9. The method of claim 1, wherein the securing of the content comprises:
   generating secured content based at least in part on the content stored at the public storage location; and
   replacing the content stored at the public storage location with the secured content.

10. The method of claim 1, wherein one or more of the detecting, determining and securing steps are performed by one or more of a library associated with the managed application, the managed application, and a management agent.

11. The method of claim 1, wherein the determining of whether the content is stored at the public storage location includes:
    determining, at least in part in response to the detected state-related event, that the content is stored at the public storage location.

12. The method of claim 1, further comprising:
    receiving, in a context of the managed application, a content transfer indication associated with the content; and
    providing, based at least in part on the content transfer indication, the content to the public storage location, such that the content provided to the public location is accessible to at least one application that is not included in the managed set of applications.

13. The method of claim 12, further comprising removing the content from the context of the managed application.

14. The method of claim 1, wherein the state-related event includes a transition of the managed application from an active state to an inactive state in conjunction with a transition of an application not included in the managed set from an inactive state to an active state.

15. The method of claim 1, wherein after the content is secured, the secured content is not accessible to an application not included in the managed set of applications.

16. A system, comprising:
a processor; and
a memory coupled with the processor, wherein the memory is configured to provide the processor with instructions which when executed cause the processor to:
detect a state-related event affecting accessible of content used in association with a managed application in a managed set of applications, wherein the state-related event includes one or more of: (i) closing the managed application, (ii) killing the managed application, (iii) transitioning of the managed application from a foreground state to a background state, (iv) transitioning of the managed application from the foreground state to a suspended state, and (v) transitioning of the managed application from an active state to an inactive state;
in response to detecting the state-related event, determine whether the content is stored at a public storage location on a mobile device; and
at least partially in response to the detected state-related event and determining that the content is stored at the public storage location on the mobile device, securing the content, wherein the securing of the content includes transferring the content to a secure storage location on the mobile device, and wherein the secure storage location is accessible to the managed set of applications and is not accessible to applications not included in the managed set of applications.

17. The system of claim 16, wherein the processor is configured to secure the content at least in part by:
encrypting the content.

18. The system of claim 16, wherein the memory is further configured to provide the processor with instructions which when executed cause the processor to:
detect, at a second managed application, a second state-related event;
determine that the content is stored at the secure storage location; and
transfer the content from the secure storage location to the public storage location.

19. The system of claim 16, wherein the memory is further configured to provide the processor with instructions which when executed cause the processor to:
detect, in a context of the managed application, a second state-related event;
determine that the content is stored at the secure storage location; and
transfer the content from the secure storage location to the public storage location.

20. The system of claim 16, wherein the state-related event includes a transition of the managed application from an active state to an inactive state in conjunction with a transition of an application not included in the managed set from an inactive state to an active state.

21. A computer program product, the computer program product being embodied in a tangible non-transitory computer readable storage medium and comprising computer instructions for:
detecting a state-related event affecting an accessibility of content used in association with a managed application in a managed set of applications, wherein the state-related event includes one or more of: (i) closing the managed application, (ii) killing the managed application, (iii) transitioning of the managed application from a foreground state to a background state, (iv) transitioning of the managed application from the foreground state to a suspended state, and (v) transitioning of the managed application from an active state to an inactive state;
in response to detecting the state-related event, determining whether the content is stored at a public storage location on a mobile device; and
at least partially in response to the detected state-related event and determining that the content is stored at the public storage location on the mobile device, securing the content, wherein the securing of the content includes transferring the content to a secure storage location on the mobile device, and wherein the secure storage location is accessible to the managed set of applications and is not accessible to applications not included in the managed set of applications.

22. The computer program product recited in claim 21, further comprising computer instructions for:
encrypting the content.

* * * * *